July 23, 1963 W. KOHLHAGEN ETAL 3,098,681
JOURNAL-TYPE STAFF BEARINGS FOR MOVEMENTS AND THE LIKE
Filed Feb. 6, 1961 2 Sheets-Sheet 1

INVENTORS
Walter Kohlhagen
and Louis R. Burghoff
BY
Attorney

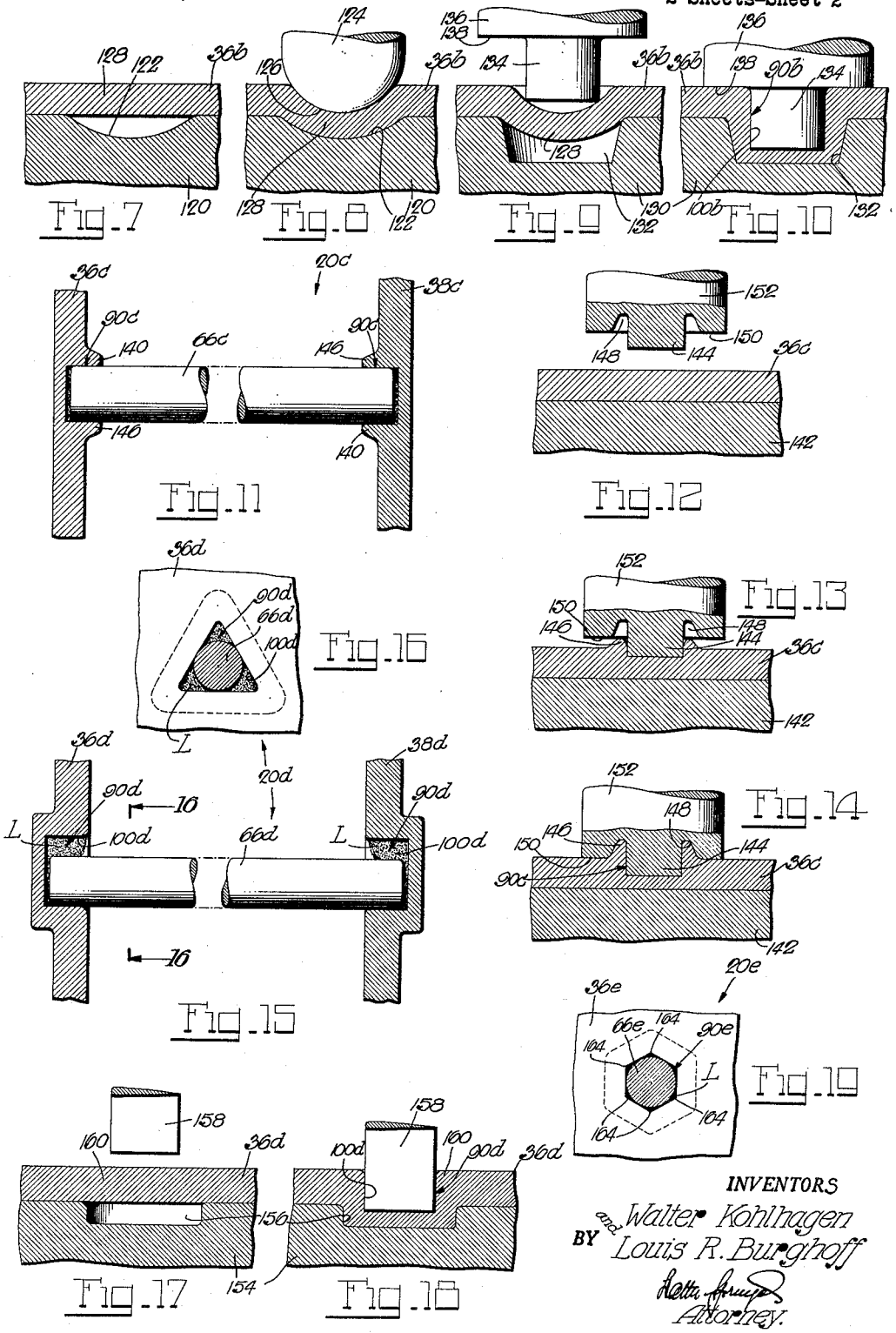

United States Patent Office 3,098,681
Patented July 23, 1963

3,098,681
JOURNAL-TYPE STAFF BEARINGS FOR MOVEMENTS AND THE LIKE
Walter Kohlhagen, Elgin, Ill., and Louis R. Burghoff, Delavan, Wis., assignors to Amphenol-Borg Electronics Corporation, Delavan, Wis., a corporation of Delaware
Filed Feb. 6, 1961, Ser. No. 87,419
5 Claims. (Cl. 308—22)

This invention relates to bearings for gear trains in general, and to staff-bearings of journal-type for movements in particular.

The present invention is concerned particularly, though not exclusively, with the usual movements of clocks and other timing devices, which are basically gear trains involving more or less numerous rotary gears that are customarily arranged between and form a self-contained unit with pillar-spaced end plates. These gears are either turnable on fixed staffs or mounted on rotary staffs between the end plates, or are combinations of both. As to gears which are turning on fixed staffs, the mounting of the latter in the end plates involves comparatively little cost, but the cost of the gearing is comparatively high, owing to the need of providing the individual gears with bearing apertures of sufficient lengths for least wear of the latter and for true running of the former in their designated planes, and further owing to the need of thrust bearing provisions on the fixed staffs to confine the gears for rotation at their designated spacing from the end plates. Moreover, the bearing apertures of these gears are usually not self-lubricating, also such tolerances as will inevitably occur in the relative location of the fixed staffs may well combine with the requisite free-running play of the gears thereon in causing some gears to run too tightly on their staffs or in causing other gears to mesh too loosely, or both, with ensuing excessive torque loss and heat generation or annoying gear noise, or both.

Gears which are mounted on rotary staffs do not have the aforementioned disadvantages of rotary gears on fixed staffs and are for this reason far preferable to the latter gear arrangement. Thus, it is a simple matter to press these gears on their staffs in position thereon within the rather wide tolerances permitted by the designs of the gear trains of most movements, with the gears being securely held on the staffs regardless of whether they are in their flat blanked form or provided with outwardly turned center sleeve formations. Also, since these gears are fixed on their staffs they are devoid of bearing apertures and, hence, involve no consideration of lubrication of the latter. Furthermore, the lack of any running play of these fixed gears on their rotary staffs makes for optimum uniformity of their mesh and, hence, quiet running, especially since such tolerances as may occur in the alignment of the end bearings of rotary staffs have at the most an inconsequential effect on the mesh of the gears involved. Moreover, since each of these rotary staffs requires two opposite end bearings, the wear of each such bearing is kept at an absolute minimum. However, despite these and other advantages of fixed gears on rotary staffs, the bearing arrangements for these staffs, being necessarily of combined journal and thrust type, are either quite expensive or are relatively inexpensive but also inferior. Among these, the bearing arrangements of lasting good performance involve various types of self-lubricating end bearings the overall cost of which, including that of their assembly or formation in a movement, is out of proportion with the cost of the rest of the movement and may well be prohibitive for many movements. On the other hand, the least expensive bearing arrangements for rotary staffs involve holes in the end plates and reduced journal ends on the staffs which turn in these holes without benefit of self-lubrication. These latter bearing arrangements are particularly inferior, not only due to any lack of self-lubrication, but also due to unavoidable wide tolerances in their play in both, lateral and axial directions and further due to their inherent structural weakness and subjection to rapid wear from friction or accessive heat generation, considering the thin pin-like staffs of the average movements involved and their further reduction at the ends to provide the mostly flimsy journals thereat. It is for these reasons that the latter bearing arrangements are used only in movements in which the lowest possible cost is of prime importance and not overly serious imperfections in operation are tolerated in consequence.

It is the primary aim and object of the present invention to provide in movements end bearings of combined journal and thrust type for rotary staffs in the first place, and, most importantly, to provide such end bearings which from the overall viewpoint of performance and cost are vastly superior to the prior end bearings of this type.

It is another object of the present invention to provide for the rotary staffs in movements end bearings of combined journal and thrust type which have the same lasting good performance as the aforementioned self-lubricating end bearing arrangements of the more expensive kinds, yet are in their overall cost far lower than the latter bearing arrangements, and even at least as low as that of the aforementioned least expensive but greatly inferior bearing arrangements.

It is a further object of the present invention to provide for the rotary staffs in movements end bearings of this type that are in the simple form of bearing recesses directly in the end plates which may, and preferably do, extend into embossed or projecting side formations on the end plates that lend maximum wall thickness to the latter thereat. In thus providing these recess-type bearings at embossed parts of the end plates, their bearing depth is fully adequate for holding relatively long journal ends of the staffs regardless of tolerances of the length of the latter and still hold a goodly supply of lubricant which will provide adequate bearing lubrication, journalwise as well as thrustwise, for the life of the movement. Furthermore, since the bottoms of these recess-type bearings constitute efficiently lubricated thrust bearings for the staffs, the latter require no reduced journal ends and may be kept at their full diameter uniformly throughout, permitting the use of simple inexpensive staffs which may advantageously be hardened and ground throughout and, hence, also at their journal ends. Moreover, since these recess-type bearings are closed on the outside of the end plates, they are there protected from dust and other dirt in any event, and they also effectively seal at the bearings an enclosure of a movement which is otherwise sealed and formed in part by the end plates.

Another object of the present invention is to devise a method of forming the aforementioned recess-type bearings in the end plates of a movement, according to which a recess-forming punch is driven into an end plate deep enough for adequate bearing depth and also to extrude or displace plate metal thereat into a confronting die recess in form-fit therewith to form the aforementioned projecting side formation on the end plate. In thus stamping the recess-type bearings in the end plates in this fashion, they are so accurate in their shapes and dimensions as to have the attribute of precision bearings, and all bearings regardless of shapes or sizes may, in highly efficient and low-cost mass production, be formed simultaneously in an end plate in a single stamping operation with the required number and types of plungers, yet the relative location of the bearings thus formed simultaneously in any number of end plates is accurate within the closest tolerances. The formation of these bearings in accordance with the present method secures the further advantage of work-hardening them in the process of their formation in end plates which are of steel. Last, but by no means least, the present method permits the formation at the same low cost of these recess-type bearings within a wide range of different cross-sectional shapes, such as circular, triangular, square, or any other polygon, and as a result affords considerable choice in the matter of friction encountered by a particular staff in its bearing and the maximum amount of lubricant the latter may hold.

Other objects and advantages will appear to those skilled in the art from the following, considered in conjunction with the accompanying drawings.

In the accompanying drawings, in which certain modes of carrying out the present invention are shown for illustrative purposes:

FIGS. 7 to 10, inclusive, show progressive steps in the formation of another modified bearing structure in accordance with a modified method;

FIG. 11 is an enlarged fragmentary section through part of a movement featuring a further modified bearing structure;

FIGS. 12 to 14, inclusive, show progressive steps in the formation of the modified bearing structure of FIG. 11 in accordance with another modified method;

FIG. 15 is an enlarged fragmentary section through part of a movement featuring another modified bearing structure;

FIG. 16 is a section taken on the line 16—16 of FIG. 15;

FIGS. 17 and 18 show progressive steps in the formation of the modified bearing structure of FIGS. 15 and 16; and FIG. 19 is an enlarged fragmentary section through part of a movement featuring still another modified bearing structure.

Figure 1:
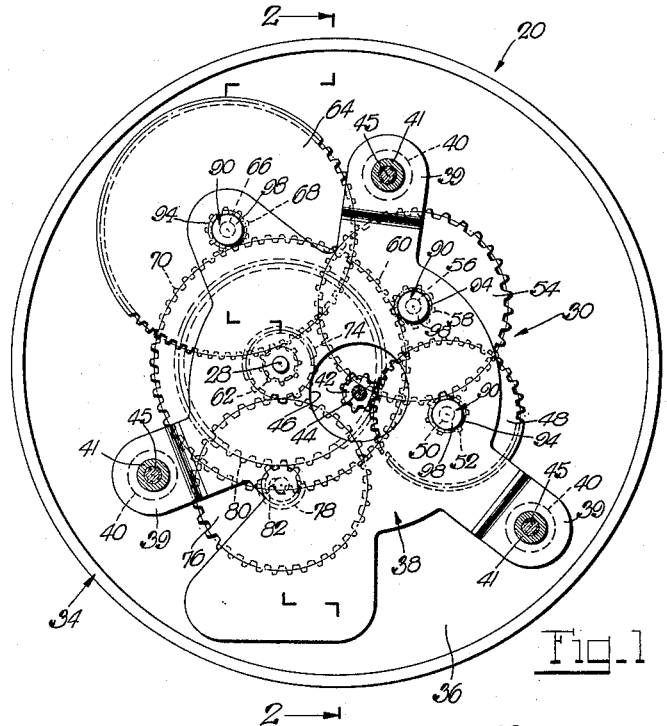
FIG. 1 is a section through a movement embodying the present invention.
Figure 2:
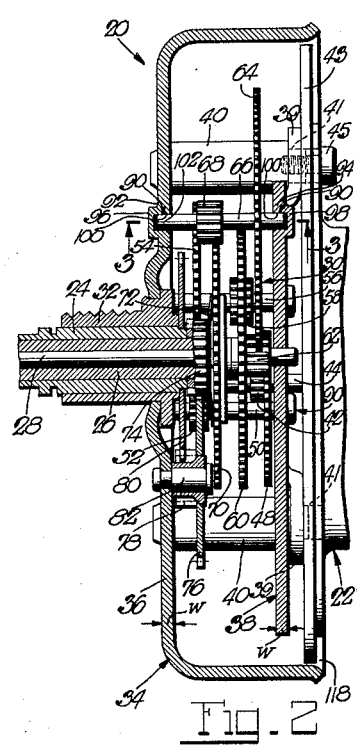
FIG. 2 is a section through the movement taken substantially on the line 2—2 of FIG. 1.

Referring to the drawings, and more particularly to FIGS. 1 and 2 thereof, the reference numeral 20 designates an exemplary movement of a timing device, presently of a clock, which has a synchronous motor 22 for its prime mover. The present movement 20 comprises hour, minute and second shafts 24, 26 and 28 which carry the usual hour, minute and sweep-second hands (not shown), and a gear train 30 which connects the motor 22 with these shafts. The hour, minute and second shafts 24, 26 and 28 are nested in conventional manner and received in a mounting sleeve 32 on a cup-shaped gear case 34 the bottom 36 of which forms one of the end plates of the present movement, with the opposite end plate 38 being held in spaced parallel relation therewith by pillars 40. In the present instance, the end plate 38 has apertured lugs 39 which are located on reduced ends 41 of the pillars 40. Also located on these reduced pillar ends 41 is the motor 22, presently with its outer field plate 43, with the motor 22 and the adjacent end plate 38 being secured to the pillars 40 by screws 45.

The gear train 30 comprises, in the present instance, a pinion 42 on the output shaft 44 of the synchronous motor 22 which projects through an aperture 46 in the end plate 38 and is in mesh with a gear 48 on a staff 50 that also carries a pinion 52 which is in mesh with a gear 54 on a staff 56. Also carried by the staff 56 is a pinion 58 which is in mesh with a gear 60 that is mounted on the second shaft 28. Turning with the gear 60 is a pinion 62 which is in mesh with a gear 64 on a staff 66 that also carries a pinion 68 which is in mesh with a gear 70. Gear 70 is turnable on the second shaft 28 and coupled to the minute shaft 26 by a friction disc 72, thus normally driving the minute shaft and also permitting setting of the same, and also of the hour shaft 24 as will appear presently. Carried by the minute shaft 26 is a pinion 74 which is in mesh with a gear 76 having a coaxial pinion 78 that is in mesh with a gear 80 on the hour shaft 24. The gear 76 and pinion 78 are turnable on a stud 82 on the end plate 36. The described gear train 30, presently of reduction-type, is entirely conventional and will drive the hour, minute and second shafts 24, 26 and 28 at the usual rates.

Figures 3, 4:
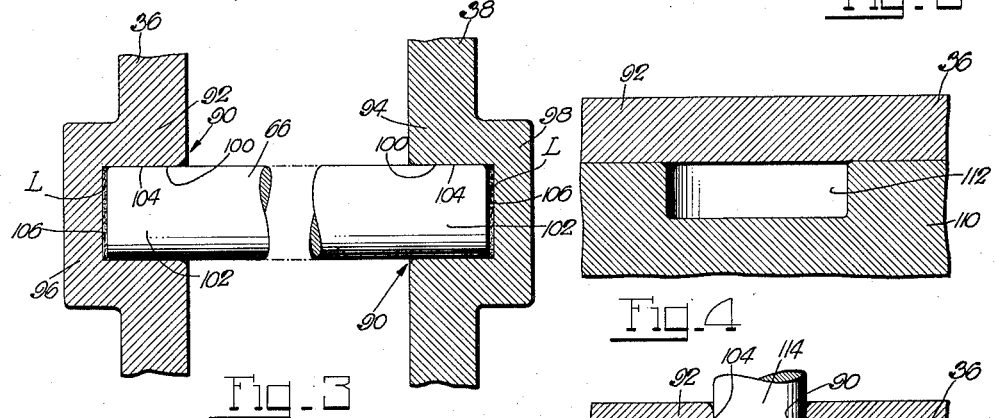
FIG. 3 is an enlarged fragmentary section through a part of the movement taken substantially on the line 3—3 of FIG. 2, and featuring a bearing structure of the present invention.
FIGS. 4 and 5 show progressive steps in the formation of the featured bearing structure in accordance with a method of the present invention.

The staffs 50, 56 and 66 are rotary staffs, permitting their respective gears and pinions to be advantageously press-fitted thereon. For the rotary support of these staffs, there are provided end bearings 90 which form the subject matter of the present invention. These end bearings, which are formed directly in the end plates 36 and 38, are presently identical, wherefore a detailed description of the end bearings 90 for the staff 66 in FIGS. 1 to 3 will suffice for an understanding of all of these end bearings. Thus, the particular pair of aligned end bearings 90 for the staff 66 comprises parts 92 and 94 of the end plates 36 and 38 having projecting side formations or protrusions 96 and 98 for increased, and presently maximum, wall thickness of these plate parts thereat, and bearing recesses 100 in the plate parts 92 and 94 which extend depthwise in the maximum wall thickness of the latter and are formed for journal-fit reception of the journal ends 102 of the staff 66. Thus, with the journal ends 102 of the staff 66 being cylindrical and the latter being presently of uniform diameter throughout, the present bearing recesses 100 are also cylindrical, with their cylindrical walls 104 serving as journal bearings, and with their bottoms 106 serving as end thrust bearings, for the staff 66. The bearing recesses 100 thus are combined journal and thrust bearings which advantageously hold a supply of lubricant L, with the staff 66 having the usual end play in these bearing recesses, preferably more than shown in FIG. 3, in order to hold in the bottoms of these recesses sufficient lubricant from which the staff journals 102 may draw by capillary action for their adequate lubrication for the life of the movement.

Considering that the movement 20 is shown in FIGS. 1 and 2 at an enlarged scale, and that the average movement of the vast majority of electric clocks and also other timing devices is considerably smaller, it will be appreciated that the featured end bearings 90 lend themselves particularly, though by no means exclusively, to staffs of small diameters and end plates of metal plate stock of small wall thickness. Thus, given by way of example only, the movement shown in FIGS. 1 and 2 is drawn at twice the scale of an actual movement of which the diameter of the staff 66 is approximately .060" and the wall thickness $w$ of the end plates 36 and 38 is approximately .040". Accordingly, with the present arrangement of the end bearings 90, the diameter of the staff 66 may be larger, and presently is larger, than the wall thickness of either end plate 36 or 38, yet the effective length of each end bearing 90 may advantageously be, and presently is, larger than the wall thickness of either end plate by forming the bearing recesses 100 to corresponding depths in the enlarged wall thicknesses of the respective plate parts 92 and 94.

Figures 5, 5A:
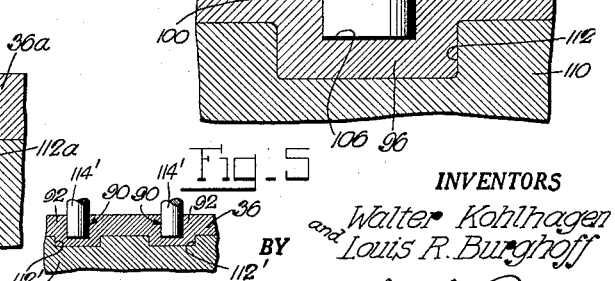
FIG. 5A shows an intermediate step in the simultaneous formation of a plurality of featured bearing structures in accordance with the same method.

The end berings 90 are formed in the end plates 36 and 38 in accordance with a methd which is part of the present invention. This method is demonstrated in FIGS. 4 and 5 in the formation of one of these end bearings, presently in the end plate 36, according to which the bearing recess 100 and the protrusion 96 are formed by punch-and-die impression and struck-up from the end plate 36. Thus, the end plate 36 is with its part 92 backed with one side on a die 110 having a recess 112 which faces the backing side of the plate part 92, whereupon the latter is formed into a bearing cup that protrudes from the backing side of the end plate immediately adjacent the plate part 92, by driving a bearing-forming punch 114, presently of cylindrical shape, into the plate part 92 from the opposite side thereof and within the confines of the die recess 112 to a sufficient depth to displace plate metal into the latter in substantial form-fit therewith (FIG. 5). The plate metal of the plate part 92 overlying the die recess 112 is on a single penetration by the punch 114 thus extruded in part into the die recess 112 and is highly compacted throughout in form-fit with the latter and also with the punch 114, resulting in the formation of the bearing recess 100 with its dimensions being of the utmost accuracy. Furthermore, the displacement of most of the plate metal of the plate part 92 and its high compacting between the die 110 and the penetrating punch 114 will beneficially work-harden the bearing recess 100 if the end plate 36 is made of, and preferably blanked from, steel plate stock.

Since in the exemplary movement 20 each end plate 36 and 38 has a plurality of, presently three, end bearings 90, the latter may advantageously be formed simultaneously in a single operation in each end plate, even if the end bearings should have different dimensions for rotary staffs of different dimensions which they do not have in the present example. Thus, FIG. 5A shows the simultaneous formation of two of these end bearings 90 in the end plate 36, with the latter backed on a die 110' with recesses 112' and with punches 114' being at the end of their penetration in the plate parts 92 and concluding the formation of the end bearings 90.

The present featured end bearings 90 for the rotary staffs 50, 56 and 66 secure a number of important advantages. From the overall viewpoint of performance and cost, they are vastly superior to prior end bearings for rotary staffs of movements and the like. Thus, the present end bearings are self-lubricating and most accurate in their bearing shapes and dimensions, affording also more than adequate bearing surface area for staffs and end plates of most any, and even the smallest, diameters and wall-thicknesses, respectively, wherefore they have all the attributes that make for optimum performance. On the other hand, the provision of these featured end bearings directly in the end plates in acocrdance with the present method makes for their formation in highly efficient mass production at exceedingly low cost. The efficient mass production of all of these end bearings simultaneously in each end plate and the exceedingly low cost thereof is thus even further enhanced, and the relative location of all end bearings in each end plate is, moreover, most accurate which contributes greatly to the smooth and lasting performance of the end bearings for each rotary staff. Of course, these end bearings permit the use of gear-carrying rotary staffs with all their inherent advantages, even permitting the highly advantageous use of rotary staffs of uniform diameters throughout which, moreover, may at negligible cost be advantageously hardened and ground for their optimum performance for the longest time. Also, wherever the end plates are of steel, the formation of the featured end bearings in accordance with the present method results in their beneficial work-hardening which enhances their lasting good performance still further. Last, but by no means least, the present featured end bearings, being sealed on the outside, lend themselves admirably to movements which are sealed-in, or substantially so, in order to be protected from dust and other dirt. In this latter respect, the present exemplary movement 20 is effectively sealed, since the end plate 36 is part of the cup-shaped case 34 within which the other end plate 38 is located and the open end 118 of which is effectively closed by the outer field plate 43 of the motor 22. Also, the case 34 and the end plate 38 may conveniently be blanked from any suitable flat plate stock, such as steel, aluminum or brass, for example, and formed into their final shapes before forming the featured end bearings 90 therein.

Figure 6:
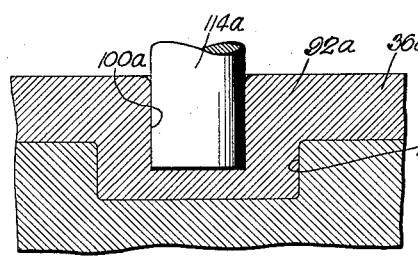
FIG. 6 shows the formation according to the same method of a bearing structure which embodies the present invention in a modified manner.

While the bearing recesses 100 of the described exemplary end bearings 90 are deeper than the wall thicknesses of the end plates 36 and 38 in which they are formed, they may be made still deeper in relation to the wall thicknesses of their end plates. Thus, the bearing recess 100a in the end plate 36a in FIG. 6 is of greater depth than any of the bearing recesses 100 in FIG. 3. This is achieved by making the die recess 112a of larger diameter and penetrating the punch 114a deeper into the enlarged wall thickness of the plate part 92a, though there are obvious limits to the flow or displacement of plate metal into form-fit with an enlarged die recess in response to deeper penetration of the punch into the plate part.

Still deeper end bearings 90b of the featured type (FIG. 10) may be formed in an end plate 36b of a movement in accordance with the modified method demonstrated in FIGS. 7 to 10. Thus, the end plate 36b is backed on a die 120 having a relatively shallow, and presently concave, recess 122 (FIG. 7), whereupon a punch 124 is driven with its presently spherical end 126 into the part 128 of the end plate overlying the die recess 122 to make it conform with the latter and form a protruding formation on the rest of the end plate (FIG. 8). The end plate 36a is thereupon backed on another die 130 (FIG. 9) having a cylindrical, and presently frustoconical, recess 132 into which the protruding plate formation 128 projects, whereupon a punch 134 is driven into the latter to a depth sufficient to displace plate metal into the die recess 132 in substantial form-fit therewith (FIG. 10). To achieve this, the depth to which the punch 134 has to be driven into the protruding plate formation 128 is quite considerable, resulting in the larger depth of the bearing recess 100b which presently is slightly over twice the ordinary wall thickness of the end plate 36b. Since the protruding plate formation 128 has to be reformed around the punch 134 throughout its length in order to obtain the bearing recess 100b of the desired depth, the punch 134 has an enlarged shank 136 with an annular shoulder 138 which cooperates with the punch 134 in forming the true bearing recess 100b.

While in the exemplary movement 20 of FIGS. 1 and 2 the protruding formations on the end plates at which the featured end bearings are formed are at the far or remote sides of these end plates, FIG. 11 shows a modified movement 20c in which the protruding formations 140 on the end plates 36c and 38c at the featured bearings 90c for a rotary staff 66c are on the sides of the end plates which face each other. To this end, the end bearings 90c are formed in accordance with a modified method which is demonstrated in FIGS. 12 to 14 in the formation of an end bearing 90c in the end plate 36c. Thus, the end plate 36c is backed on a solid die block or support 142 (FIG. 12), whereupon a punch 144 is driven into the backed end plate (FIG. 13), with the result that plate metal is displaced by the punch 144 and progressively swells higher around the latter in the form of a protruding skirt 146. As the punch 144 penetrates deeper into the end plate 36c to its greatest depth therein (FIG. 14), an annular die recess 148 in the annular shoulder 150 of an enlarged shank 152 of the punch 144 and surrounding the latter reforms the growing metal skirt 146 to conform to the shape of the die recess 148 as well as to the cylindrical shape of the punch 144 throughout its length.

While the bearing recesses of the featured end bearings described so far are cylindrical in cross-section, they may be of any other desired cross-sectional shapes, such as triangular, square, or any other polygonal shape. Thus, FIGS. 15 and 16 show a movement 20d in which the bearing recesses 100d of the featured end bearings 90d in the end plates 36d and 38d for a rotary staff 66d are of equilateral trianguler shape in cross-section. The formation of one of these end bearings 90d in the end plate 36d is shown in FIGS. 17 and 18. Thus, the end plate 36d is backed on a die 154 having a triangular recess 156 (FIG. 17), whereupon a triangular punch 158 is driven into the part 160 of the end plate overlying the die recess 156 to a depth sufficient to displace plate metal into the latter in substantial form-fit therewith (FIG. 18). The bearing recess 100d thus formed (FIG. 16) corresponds most accurately to the equilateral triangular cross-section of the punch 158. The advantages of the present end bearings 90d are self-evident. Thus, while the present end bearings 90d are as accurate journal bearings as the described cylindrical bearings of this type, they have minimum contact area with the journal ends of the staff 66d and, hence, offer minimum frictional resistance to the drive of the staff, and, equally important, they hold considerably larger supplies of lubricant L which, moreover, is not subject to displacement from the bearing recesses 100d on actual end shake back and forth of the staff 66d. In this connection, the lubricant may be either grease or oil and it will be safely retained in the bearing recesses 100d in by far the greater majority of movements of the sizes heretofore mentioned which involve staff journals of relatively small diameters.

Reference is finally had to FIG. 19 which shows in an end plate 36e of a movement 20e still another modified end bearing 90e of the featured type that is of a different polygonal cross-section than the triangular end bearings 90d of FIGS. 15 and 16. In the present example, the end bearing 90e is of hexagonal cross-section, having greater overall contact area with the journal end therein of the staff 66e than have the triangular end bearings 90d of FIGS. 15 and 16 with the journal ends of the staff 66d, but having still quite large spaces 164 for holding lubricant L that will not be forced out from the end bearing on actual end shake back and forth of the staff 66e.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:
1. In a movement, the combination with spaced metal end plates and a rotary staff with end journals of which at least one journal is of a diameter larger than the wall thickness of one of the plates, of aligned end bearings for said staff journals on said plates, of which the bearing for said one end journal comprises a substantially cylindrical protrusion on one side of said one plate of a diameter larger than that of said one journal and of such height that the wall thickness of said one plate is thereat increased beyond the diameter of said one journal, and a bearing recess in said one plate centrally of said protrusion and open at the side of said one plate facing the other plate and otherwise closed, with said recess being cross-sectionally dimensioned for fitted reception of said one end journal and being of a depth in excess of the non-increased wall thickness of said one plate, and said recess and protrusion being formed by punch-and-die impression in and struck-up from said one plate, respectively.

2. The combination in a movement as set forth in claim 1, in which said protrusion is on the side of said one plate opposite to that facing the other plate.

3. The combination in a movement as set forth in claim 1, in which said protrusion is on the side of said one plate facing the other plate.

4. The combination in a movement as set forth in claim 1, in which said bearing recess is cylindrical.

5. The combination in a movement as set forth in claim 1, in which said bearing recess is of polygonal cross-section.

References Cited in the file of this patent

UNITED STATES PATENTS

| | | |
|---|---|---|
| 1,491,906 | Garman | Apr. 29, 1924 |
| 2,109,035 | Schafer | Feb. 22, 1938 |
| 2,219,067 | Colomb | Oct. 22, 1940 |
| 2,330,729 | Meredith et al. | Sept. 28, 1943 |
| 2,446,515 | Weingart | Aug. 3, 1948 |
| 2,747,266 | Schaming | May 29, 1956 |
| 2,771,786 | Gilbert et al. | Nov. 27, 1956 |
| 2,908,180 | Swenson | Oct. 13, 1959 |

FOREIGN PATENTS

| | | |
|---|---|---|
| 24,698 | Australia | Aug. 5, 1930 |